United States Patent
Roberts et al.

(10) Patent No.: US 8,929,749 B2
(45) Date of Patent: Jan. 6, 2015

(54) MINIMUM VARIANCE CARRIER RECOVERY

(75) Inventors: Kim B. Roberts, Ottawa (CA); Shahab Oveis Gharan, Ottawa (CA); Amir Khandani, Kitchener (CA)

(73) Assignee: Ciena Corporation, Hanover, MD (US)

( * ) Notice: Subject to any disclaimer, the term of this patent is extended or adjusted under 35 U.S.C. 154(b) by 331 days.

(21) Appl. No.: 13/253,331

(22) Filed: Oct. 5, 2011

(65) Prior Publication Data

US 2013/0089341 A1    Apr. 11, 2013

(51) Int. Cl.
H04B 10/06 (2006.01)
H04L 27/38 (2006.01)
H04B 10/61 (2013.01)
H04L 27/227 (2006.01)

(52) U.S. Cl.
CPC ........ H04B 10/6165 (2013.01); H04L 27/3836 (2013.01); H04L 27/2271 (2013.01)
USPC ........... 398/208; 398/202; 398/203; 398/204; 398/205

(58) Field of Classification Search
USPC .................................. 398/154, 152, 159, 147
See application file for complete search history.

(56) References Cited

U.S. PATENT DOCUMENTS

| | | | |
|---|---|---|---|
| 7,013,089 B1 * | 3/2006 | Ho et al. | 398/159 |
| 7,555,227 B2 | 6/2009 | Bontu et al. | |
| 7,606,498 B1 * | 10/2009 | Wu et al. | 398/152 |
| 8,204,156 B2 * | 6/2012 | Hewavithana et al. | 375/324 |
| 2011/0150505 A1 | 6/2011 | Roberts et al. | |
| 2012/0155890 A1 * | 6/2012 | Zhou et al. | 398/208 |

OTHER PUBLICATIONS

Feedforward carrier recovery for coherent optical communication, Ezra Ip and Joseph Kahn,Journal of Lightwave Technology, vol. 25, No. 9, Sep. 2007.*
Alan V. Oppenheim and George C. Verghese, 2010.*
Zhang, et al., "Pilot-Assisted Decision-Aided Maximum-Likelihood Phase Estimation in Coherent Optical Phase Modulated Systems With Nonlinear Phase Noise", Photonics Technology Letters, vol. 22, No. 6, pp. 380-382, (2010).
Zhou, et al., "Low-Complexity, Blind Phase Recovery for Coherent Receivers Using QAM Modulation", OSA/OFC/NFOEC 2011, pp. 1-3.
Ip, et al., "Coherent Detection in Optical Fiber Systems", Optical Society of America 2007. pp. 1-38.
Fatadin, et al., "Blind Equalization and Carrier Phase Recovery in a16-QAM Optical Coherent System", Journal of Lightwave Technology, vol. 27, Issue No. 15, pp. 3042-3049, (2009).
Gao, et al., "Low-Complexity Two-Stage Carrier Phase Estimation for16-QAM Systems using QPSK Partitioning and Maximum Likelihood Detection", OSA/OFC/NFOEC 2011, pp. 1-3.
Zhuge, et al., "Low Computation Complexity Two-Stage Feedforward Carrier Recovery Algorithm for M-QAM", OSA/OFC/NFOEC 2011, pp. 1-3.

* cited by examiner

Primary Examiner — Shi K Li
Assistant Examiner — Mina Shalaby
(74) Attorney, Agent, or Firm — Kent Daniels; Daniels IP Sevices Ltd

(57) ABSTRACT

Methods and systems of data symbol recovery in a coherent optical receiver of an optical communications system. A respective probabilistic phase error is calculated for each of a plurality of data symbol estimates. A phase rotation is calculated based on the probabilistic phase error estimates, using a filter function, and the phase rotation applied to at least one data symbol estimate to generate a corresponding rotated symbol estimate. Each rotated symbol estimate is processed to generate corresponding decision values of each data symbol.

18 Claims, 7 Drawing Sheets

MINIMUM VARIANCE CARRIER RECOVERY

CROSS-REFERENCE TO RELATED APPLICATIONS

This application is the first application filed for the present invention.

MICROFICHE APPENDIX

Not Applicable.

TECHNICAL FIELD

The present invention relates generally to optical communication systems, and in particular to systems and methods for data symbol recovery in a coherent receiver.

BACKGROUND

In optical communication systems that employ coherent optical receivers, the modulated optical signal received at the coherent receiver is mixed with a narrow-line-width local oscillator (LO) signal, and the combined signal is made incident on one or more photodetectors. The frequency spectrum of the electrical current appearing at the photodetector output(s) is substantially proportional to the convolution of the received optical signal and the local oscillator (LO), and contains a signal component lying at an intermediate frequency that contains data modulated onto the received signal. Consequently, this "data component" can be isolated and detected by electronically filtering and processing the photodetector output current.

The LO signal is typically produced using a semiconductor laser, which is typically designed to have a frequency that closely matches the frequency of the laser producing the carrier signal at the transmitter. However, as is known in the art, such semiconductor lasers exhibit a finite line width from non-zero phase noise. As a result, frequency transients as high as ±400 MHz at rates of up to 50 kHz are common. This frequency offset creates an unbounded linear ramp in the phase difference between the two lasers. In addition, many such lasers often exhibit a line width of the order of 1 MHz with a Lorenzian spectral shape. As a result, even if the transmitter and LO lasers were to operate at exactly the same average frequency, a phase error linewidth of about ±2 MHz can still exist. This Lorenzian spectrum creates a phase variance that grows linearly with time, and the initial phase difference is random, so over the lifetime of operation of the optical connection the phase error is unbounded.

As is known in the art, data is typically encoded in accordance with a selected encoding scheme (eg Binary Phase shift Keying (BPSK); Quadrature Phase Shift Keying (QPSK), 16-Quadrature Amplitude Modulation (16-QAM) etc.) to produce symbols having predetermined amplitude and phase. These symbols are then modulated onto an optical carrier for transmission through the optical communications system to a receiver. At the receiver, the received optical signal is processed to determine the most likely value of each transmitted symbol, so as to recover the original data.

As is known in the art, a frequency mismatch or offset $\Delta f$, and independent phase noise between the transmitter and LO laser appears as a time-varying phase $\theta$ of the detected symbols, relative to the phase space of the applicable encoding scheme. This variation of the symbol phase $\theta$ is exacerbated by phase non-linearities of the optical communications system, and in particular, cross-phase modulation (XPM). The symbol phase $\theta$ is unbounded, in that it tends to follow a random-walk trajectory and can rise to effectively infinite multiples of $2\pi$. Because the symbol phase $\theta$ is unbounded, it cannot be compensated by a bounded filtering function. However, unbounded filtering functions are susceptible to cycle slips and symbol errors, as will be described in greater detail below.

Applicant's U.S. Pat. No. 7,606,498 entitled Carrier Recovery in a Coherent Optical Receiver, which issued Oct. 20, 2009, teaches techniques for detecting symbols in the presence of a frequency mismatch between the received carrier (that is, the transmitter) and the LO laser. The entire content of U.S. Pat. No. 7,606,498 is incorporated herein by reference. In the system of U.S. Pat. No. 7,606,498, an inbound optical signal is received through an optical link 2, split into orthogonal polarizations by a Polarization Beam Splitter 4, and then mixed with a Local Oscillator (LO) signal 6 by a conventional 90° hybrid 8. The composite optical signals emerging from the optical hybrid 8 are supplied to respective photodetectors 10, which generate corresponding analog signals. The analog photodetector signals are sampled by respective Analog-to-Digital (A/D) converters 12 to yield multi-bit digital sample streams corresponding to In-phase (I) and Quadrature (Q) components of each of the received polarizations.

The format and periodicity of the SYNC bursts may conveniently be selected as described in U.S. Pat. No. 7,606,498. In each of the embodiments illustrated in FIGS. 2a and 2b, the optical signal includes nominally regularly spaced SYNC bursts 14 embedded within a stream of data symbols 16. Each SYNC burst 14 has a respective predetermined symbol sequence on each transmitted polarization. In the embodiment of FIG. 2a, two orthogonal symbol sequences are used in each SYNC burst 14; each symbol sequence being assigned to a respective transmitted polarization. FIG. 2b illustrates an alternative arrangement, in which each of the I and Q components of each transmitted polarization is assigned a respective orthogonal symbol sequence.

Returning to FIG. 1, from the A/D converter 12 block, the I and Q sample streams of each received polarization are supplied to a respective dispersion compensator 18, which operates on the sample stream(s) to compensate chromatic dispersion. The dispersion-compensated sample streams appearing at the output of the dispersion compensators 18 are then supplied to a polarization compensator 20 which operates to compensate polarization effects, and thereby de-convolve transmitted symbols from the complex sample streams output from the dispersion compensators 18. If desired, the polarization compensator 20 may operate as described in Applicant's U.S. Pat. No. 7,555,227 which issued Jun. 30, 2009. The entire content of U.S. Pat. No. 7,555,227 is incorporated herein by reference. The polarization compensator 20 outputs complex-valued symbol estimates X'(n) and Y'(n) of the symbols transmitted on each polarization. These symbol estimates include phase error due to the frequency offset $\Delta f$ between the Tx and LO frequencies, laser line width and Cross-phase modulation (XPM). The symbol estimates X'(n) and Y'(n) are supplied to a carrier recovery block 26 (see FIG. 1), which performs carrier recovery and phase error correction, and symbol determination. Two known carrier recovery and symbol determination techniques are described below.

In the system of U.S. Pat. No. 7,606,498 each SYNC burst is used to determine an initial phase error value $\phi_0$, which is used to calculate an initial phase rotation $\kappa_0$ for the start of processing the next block of data symbols. Once the SYNC burst has been processed, the receiver switches to a data directed mode, during which the phase rotation is updated at predetermined intervals and applied to successive data symbol estimates X'(n) and Y'(n) to produce corresponding rotated data symbol estimates $X'(n)e^{-j\kappa(n)}$ and $Y'(n)e^{-j\kappa(n)}$. The decision value X(n), Y(n) of each transmitted symbol can be determined by identifying the decision region in which the rotated symbol estimate lies, and the symbol phase error $\phi$ calculated and used to update the phase rotation.

Applicant's co-pending U.S. patent application Ser. No. 12/644,409, filed Dec. 22, 2009 teaches a zero-mean carrier recovery technique in which two or more SYNC bursts are processed to derive an estimate of a phase slope $\psi$ indicative of the frequency offset $\Delta f$ between the transmit laser and the Local Oscillator (LO) of the receiver. The phase slope $\psi$ is then used to compute a phase rotation $\kappa(n)$ which is applied to each symbol estimate X'(n), Y'(n) to produce corresponding rotated data symbol estimates $X'(n)e^{-j\kappa(n)}$, $Y'(n)e^{-j\kappa(n)}$ which can then be filtered to remove XPM and find the decision values X(n), Y(n) of each transmitted data symbol. The entire content of U.S. patent application Ser. No. 12/644,409 is incorporated herein by reference.

The processes described in U.S. Pat. No. 7,606,498 and U.S. patent application Ser. No. 12/644,409 are unbounded, and thus can compensate unbounded symbol phase $\theta$. However, both of these techniques assume that each rotated symbol estimate $X'(n)e^{-j\kappa(n)}$ and $Y'(n)e^{-j\kappa(n)}$ lies in the correct decision region of the symbol phase space. This means that when the symbol phase error $\phi$ becomes large enough (e.g. $\geq \pi/4$ for QPSK, or $\geq \pi/2$ for BPSK) the rotated symbol estimate will be erroneously interpreted as lying in a decision region that is adjacent to the correct decision region. When this occurs in respect of an isolated symbol estimate, the resulting "symbol error" will be limited to the affected symbol. On the other hand, where a significant number of symbol errors occur in succession, the receiver may incorrectly determine that a "cycle-slip" has occurred, and reset its carrier phase to "correct" the problem. Conversely, the receiver may also fail to detect a cycle slip that has actually occurred. This can result in the erroneous interpretation of a large number of symbols. FIGS. 3A and 3B illustrate this problem.

FIG. 3A illustrates a Quadrature Phase Shift Keying (QPSK) symbol constellation comprising four symbols (A-D) symmetrically disposed in a Cartesian symbol space defined by Real (Re) and Imaginary (Im) axes. In the symbol space of FIG. 3A, each quadrant corresponds with a decision region used for determining the respective decision value for each rotated symbol estimate. A rotated symbol estimate 28 is a complex value composed of Real and Imaginary components, which can therefore be mapped to the symbol space, as may be seen in FIG. 3A. It is also convenient to represent the rotated symbol estimate 28 as a polar coordinate vector having a phase $\theta$ and magnitude M, as shown in FIG. 3A.

As may be seen in FIG. 3A, the assumption that the rotated data symbol 28 estimate lies in the correct decision region means that the symbol phase error $\phi$ is calculated as the angle between the rotated data symbol estimate 28 and the nearest symbol of the encoding scheme (symbol B in FIG. 3A). As may be seen in FIG. 3B, the calculated phase error $\phi$ is zero when the phase $\theta$ corresponds with a symbol of the constellation, and increases linearly as the phase $\theta$ approaches a boundary between two decision regions. However, as the phase $\theta$ crosses a decision boundary (at $\theta=0$, $\pm \pi/2$, and $\pm \pi$ in FIGS. 3A and B), there is a discontinuity in the calculated phase error $\phi$. For example, as the phase $\theta$ increases through the decision boundary at $\pi/2$, the calculated phase error $\phi$ reaches $+\pi/4$, and then jumps to $-\pi/4$, which is $\pi/2$ away from the correct phase error. This discontinuity increases the probability of making subsequent symbol errors, and can contribute to the occurrence of cycle slips. Once a cycle slip has occurred, subsequently received symbols will be incorrectly decoded until the problem has been detected and rectified.

An alternative frequency and phase estimation technique known in the art is the Viterbi-Viterbi algorithm, in which the Cartesian coordinate symbol estimates X'(n) and Y'(n) are raised to the fourth power to determine the phase rotation value that has the greatest probability of occurring and then these values are filtered using Cartesian averaging. The resulting phase rotation is then divided by four and applied to the received samples to try to determine the most likely decision values X(n), Y(n) of each transmitted data symbol. This approach suffers a limitation in that dividing the phase estimate by four also divides the $2\pi$ phase ambiguity by four, meaning that if incorrectly resolved this ambiguity causes a $\pi/2$ cycle slip. This technique can provide satisfactory performance in cases where the phase errors are dominated by a small frequency offset between the TX and LO lasers and moderate laser line widths. However, in the presence of XPM, this approach becomes highly vulnerable to producing cycle slips.

In some cases, the above-noted problems can be mitigated by use of a sufficiently strong Forward Error Correction (FEC) encoding scheme, but only at a cost of increased overhead, which is undesirable.

Techniques for carrier recovery that overcome limitations of the prior art remain highly desirable.

SUMMARY

Disclosed herein are techniques for carrier recovery and data symbol detection in an optical communications system.

Accordingly, an aspect of the present invention provides a method of data symbol recovery. A respective probabilistic phase error is calculated for each of a plurality of data symbol estimates. A phase rotation is calculated based on the probabilistic phase error estimates, using a filter function, and the phase rotation applied to at least one data symbol estimate to generate a corresponding rotated symbol estimate. Each rotated symbol estimate is processed to generate corresponding decision values of each data symbol.

BRIEF DESCRIPTION OF THE DRAWINGS

Representative embodiments of the invention will now be described by way of example only with reference to the accompanying drawings, in which.

It will be noted that throughout the appended drawings, like features are identified by like reference numerals.

DETAILED DESCRIPTION OF PREFERRED EMBODIMENTS

The present invention exploits the observation that the probability that a symbol estimate lies in any given decision region of the applicable encoding scheme is a maximum when the symbol estimate lies on, or very near, the corresponding symbol of the encoding scheme, and decreases with increasing distance from the symbol, but is not zero at the boundary with an adjacent decision region.

In very general terms, the present disclosure provides techniques in which the symbol estimates are processed to compute a probabilistic phase error $\phi$ that reflects both the symbol phase error $\phi$ and the probability that the symbol estimate is lying in the correct decision region. The probabilistic phase error $\phi$ is then filtered and used to compute a minimum variance phase rotation $\kappa(n)$ applied to each successive symbol estimate.

An advantage of the carrier recovery technique disclosed herein is that it models the overall statistical performance of the optical communication system within the carrier recovery algorithm itself. This is an improvement over prior art techniques which model specific distortions (such as frequency offset, line width or XPM) and then relying on a strong FEC to correct erroneous symbols due to other distortions (such as ASE) in a post-processing step. This improvement is beneficial in that it allows the FEC to correct more errors from other sources, and thereby improves the performance of the optical communications system for subscriber traffic.

Figure 1:
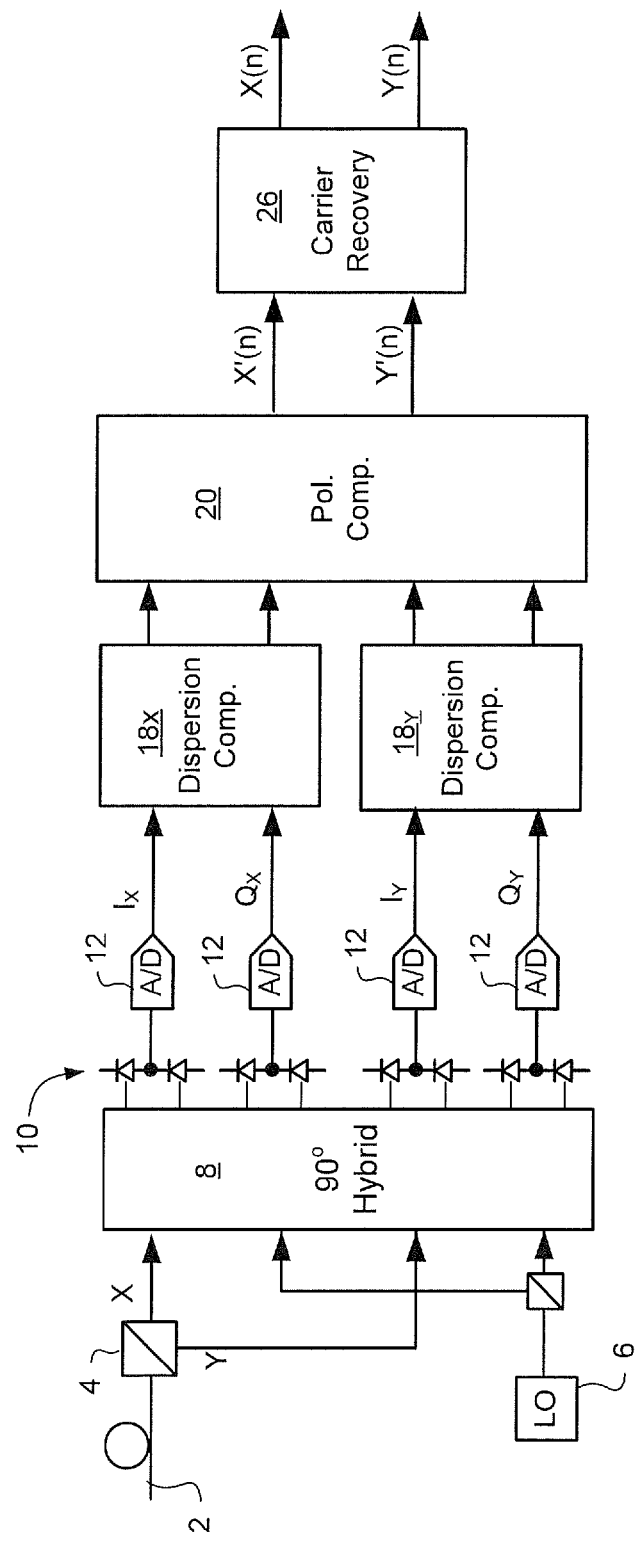
FIG. 1 is a block diagram schematically illustrating a coherent optical receiver, known from U.S. Pat. No. 7,606, 498.
Figure 2A:
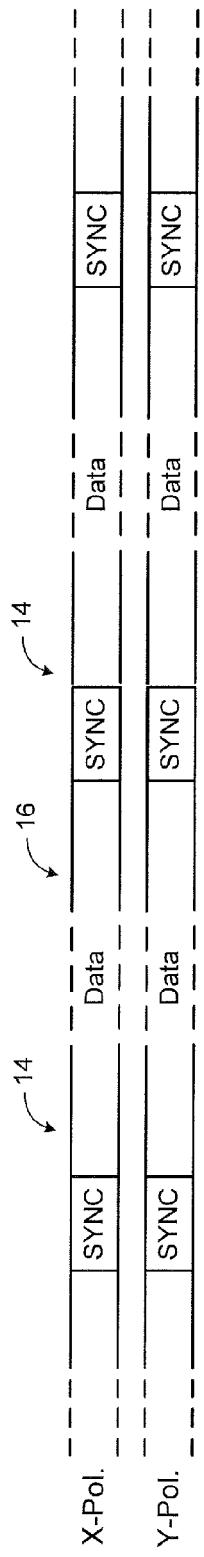
FIGS. 2a and 2b schematically illustrate respective alternative signal formats known from U.S. Pat. No. 7,606,498.
Figure 2B:
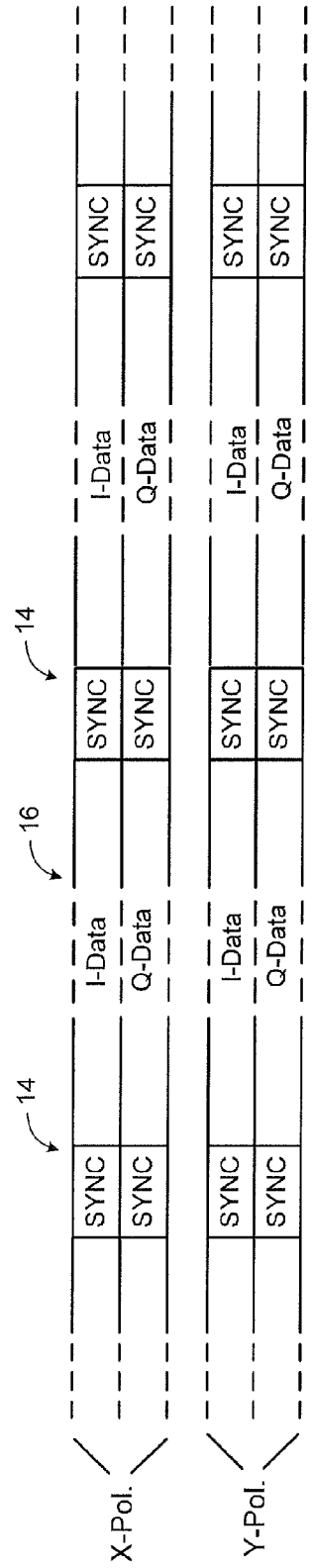
Figure 3A:
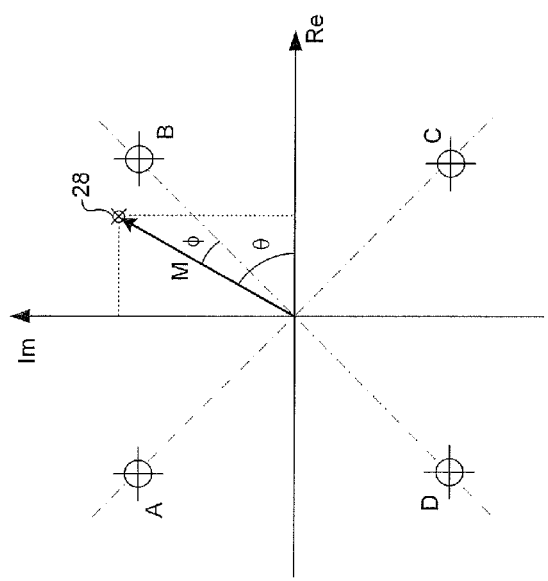
FIGS. 3A and 3B schematically illustrate relationships between rotated symbol estimates computed in accordance with the prior art, and an encoding constellation known in the prior art.
Figure 3B:
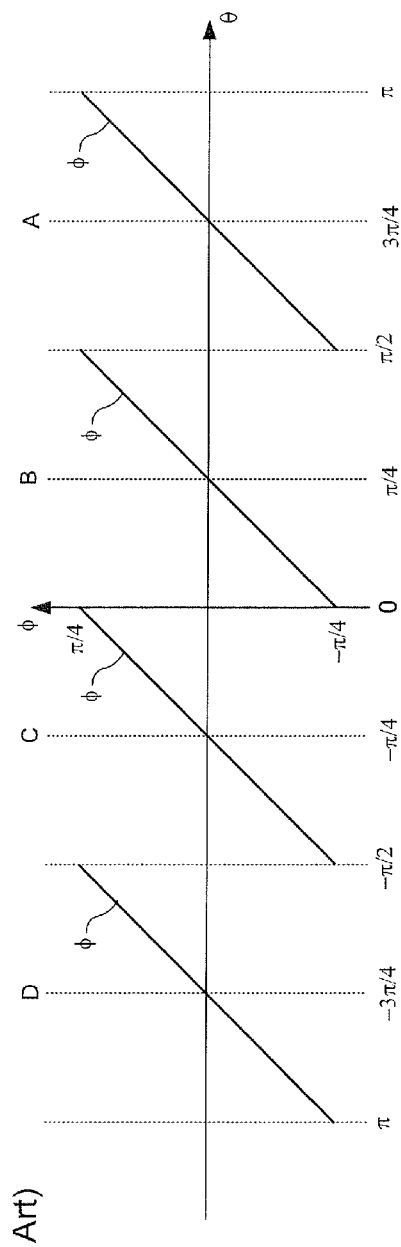

In the prior art examples of FIGS. 1-3, the phase error $\phi$ is computed as the angle between a rotated symbol estimate 28 and the nearest symbol in the applicable encoding scheme, and used to compute the phase rotation applied to successive symbol estimates. If desired, such feed-back carrier recovery techniques (and variants thereof) may be used in embodiments of the present invention. Alternatively, feed-forward techniques may be used to compute an estimate of the phase error $\phi$.

It is contemplated that embodiments of the present invention may be implemented in a coherent optical receiver using any suitable combination of hardware and software. For very high speed applications, hardware implementations, for example using one or more Field Programmable Gate Arrays (FPGAs) or Application Specific Integrated Circuits (ASICs) will normally be preferable, but this is not essential.

The probability that the rotated symbol estimate 28 lies in the correct decision region is a function of the location of the symbol estimate 28 in the symbol space of the applicable encoding scheme. Referring back to FIG. 3A, for any given value of the vector magnitude M, the probability that the symbol estimate 28 lies in the correct decision region is a maximum when the calculated phase error $\phi$ equals zero, and decreases with increasing absolute value of the phase error $\phi$. At the boundary between adjacent decision regions, the symbol estimate has an equal (non-zero) probability of being in either decision region. Accordingly, the probabilistic phase error $\phi$ will tend to be proportional to the phase error $\phi$ for values of $\phi$ close to zero, and will be zero at a boundary between adjacent decision regions, as may be seen in FIG. 4.

Figure 4:
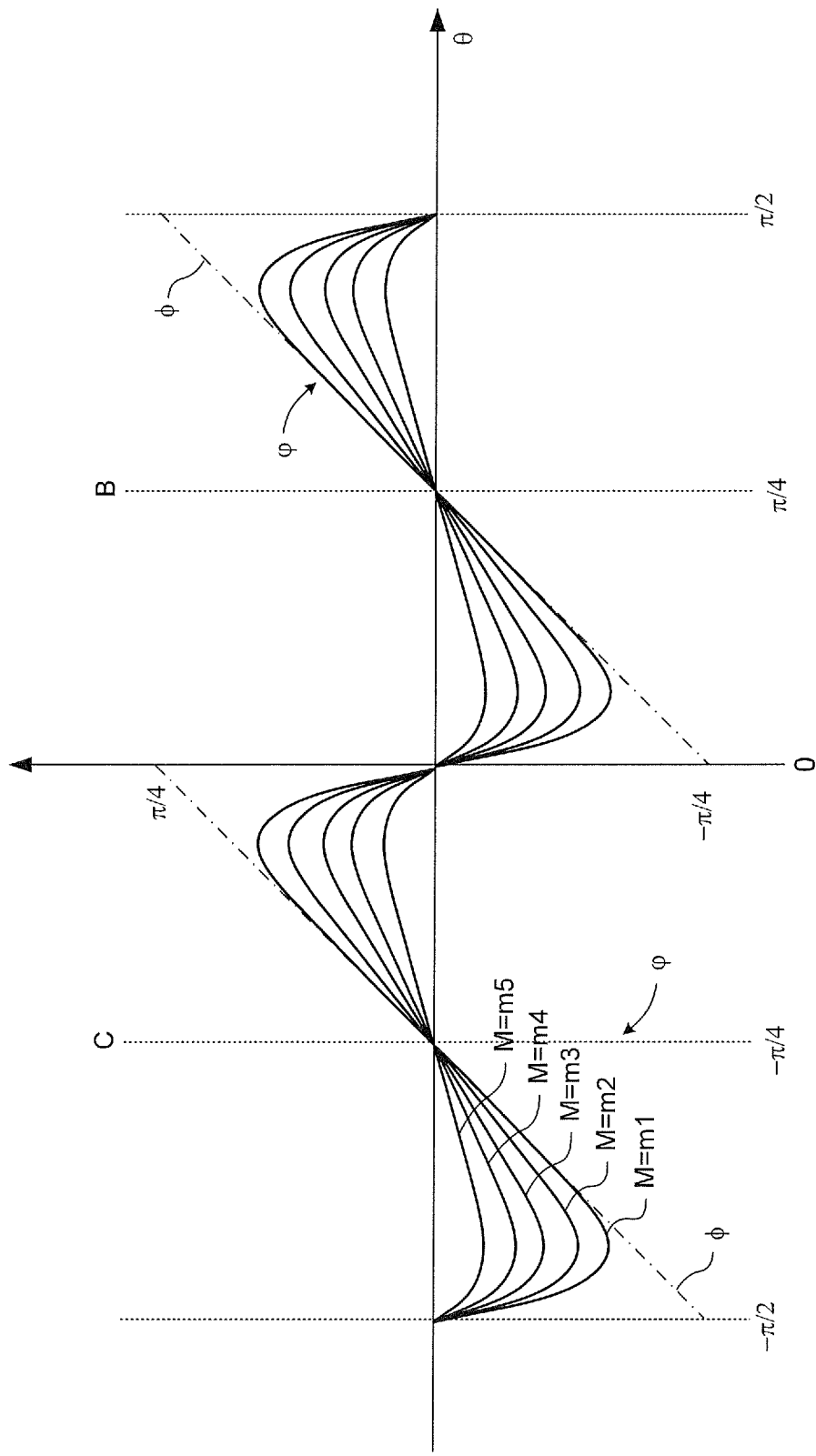
FIG. 4 is a chart schematically illustrating relationships between symbol phase error and maximum likelihood phase error in accordance with a representative embodiment of the present invention.

Furthermore, for any given symbol phase $\theta$, the probability that the symbol estimate 28 lies in the correct decision region increases with increasing values of M. This may be understood by recognizing that a given magnitude of additive noise (eg Amplified Spontaneous Emission (ASE)) affecting the rotated symbol estimate 28 will have a proportionately greater impact on the symbol phase $\theta$ at smaller values of M than at positions farther away from the origin. Accordingly, for any given value of the phase $\theta$, the probabilistic phase error $\phi$ will tend to be proportional to the magnitude M of the symbol estimate. This results in a family of probabilistic phase error curves for different values of M. FIG. 4 illustrates a family of five representative probabilistic phase error curves, for values of M=m1, m2, m3, m4 and m5, respectively. In this way, the knowledge of M is incorporated in to the probabilistic estimate.

In some embodiments, it is desirable for the calculation of the probabilistic phase error $\phi$ to minimize the variance of each phase estimate, including the variance due to symbol errors (the $L_2$ norm). In such cases, the probabilistic phase error $\phi$ can be calculated as the expected value of the random variable representing the phase error $\phi$, given the knowledge supplied (primarily symbol phase $\theta$ and magnitude M). In other embodiments, it may be desirable to minimize the peak value of the absolute error between the probabilistic estimate and the actual value of the random variable representing the phase error $\phi$, (the $L_\infty$ norm), or the integral of the error, (the $L_1$ norm), or other similar probability operations. In general, the probabilistic estimate $\hat{\phi}$ of phase-error $\phi$ can be defined, using a variety of different metrics or different operators, on the "conditional" probability density function of phase-error, conditioned on the received symbol phase $\theta$ and magnitude M. The examples mentioned above ($L_1$, $L_2$, $L_\infty$ norms) are some specific useful operators derived from the conditional probability density function of phase-error, but this list is not exhaustive.

A phase error estimate that attempts to minimize a norm in this manner gives improved performance compared to the prior art estimation methods that try to estimate the mode of the probability density, i.e. the phase with greatest probability density, with some level of quantization.

Various methods may be used to compute the probabilistic phase error $\phi$ for any given rotated symbol estimate 28. For example, two or more probabilistic phase error curves may be explicitly defined as a function of the symbol phase $\theta$ (using any suitable technique) for respective different values of the magnitude M, and then known interpolation techniques used to compute the probabilistic phase error co for the magnitude M(n) and phase $\theta$(n) of each rotated symbol estimate 28. In an alternative arrangement, a look-up table may be used to define a mapping between a set of predetermined values of the symbol phase $\theta$ and magnitude M, and the probabilistic phase error $\phi$. In operation, each rotated symbol estimate 28 can be processed to determine its phase $\theta$(n) and Magnitude M(n), which can then be used as an index vector supplied to the input of the look-up-table, which outputs the corresponding probabilistic phase error $\phi$(n). In some embodiments, rounding may be used to reduce the size of the look-up table. For example, consider a case where the phase $\theta$(n) and Magnitude M(n) of each symbol estimate are computed with 8-bits of resolution. These two values may be concatenated to produce a 16-bit index vector supplied to the look-up-table, in which case the look-up-table will require at least $2^{16}$=65 kilo-bytes of memory. If, on the other hand, the phase $\theta$(n) and Magnitude M(n) are rounded to 3 bits resolution each (e.g. by taking the 3 most significant bits), then the size of the look-up-table may be reduced to $2^6$=64 bytes of memory. Minimizing the size of this table can be important because it is accessed at the sample rate of the receiver, which can be tens of billions of samples per second.

In still further embodiments, the above-described techniques may be used, but with the probabilistic phase error φ defined as a function of the calculated symbol phase error φ rather than its phase θ. This arrangement is advantageous, in that it permits the probabilistic phase error φ(n) to be computed to a higher precision, because the symbol phase error φ only spans the angular width of a single decision region (ie π/2 for QPSK) whereas the symbol phase θ spans the entire 2π phase space.

It will be further understood that the above-noted techniques can be readily extended to encoding schemes, such as 16-QAM, for example, in which the decision regions are delimited by both phase θ and magnitude M, or to other codes such as multi dimensional codes, differential codes, and codes including both polarizations.

To further enhance accuracy of the above method for phase error estimation, the calculation of the probabilistic phase error φ(n) estimate may incorporate useful metrics and operators of a conditional probability density function of phase error, conditioned on respective symbol phase and magnitude values of a plurality of successive symbol estimates. However, the complexity of the method increases exponentially with the number of symbol estimates considered in the probabilistic phase error estimation method. As an example, the method can use the respective phase and magnitude of symbol estimates on X and Y polarization and calculate the $L_1$ norm (or any other suitable operator) of the conditional probability density function of phase-error, conditioned on $M_x$ and $M_y$ (received magnitudes on each pol.) and $θ_x$ and $θ_y$ (received phase values on each pol.). To further reduce complexity of the method, or equivalently the size of the look-up table, it is possible to use various functions of the received magnitude and phase, rather than the phase and magnitude values themselves. As an example, in the above scenario, the probabilistic phase-error estimate (based on $L_1$ or $L_2$ metric of conditional probability density function) may be conditioned on values of A and B, defined as $A=M_xM_y$, and $B=(θ_x$ modulo $π/2)+(θ_y$ modulo $π/2)$. The parameters A and B can be computed to any suitable precision, and rounded (or quantized) to 3 bits so that a 64-byte memory LUT can be used to generate the probabilistic phase error estimate φ(n).

Figure 5:
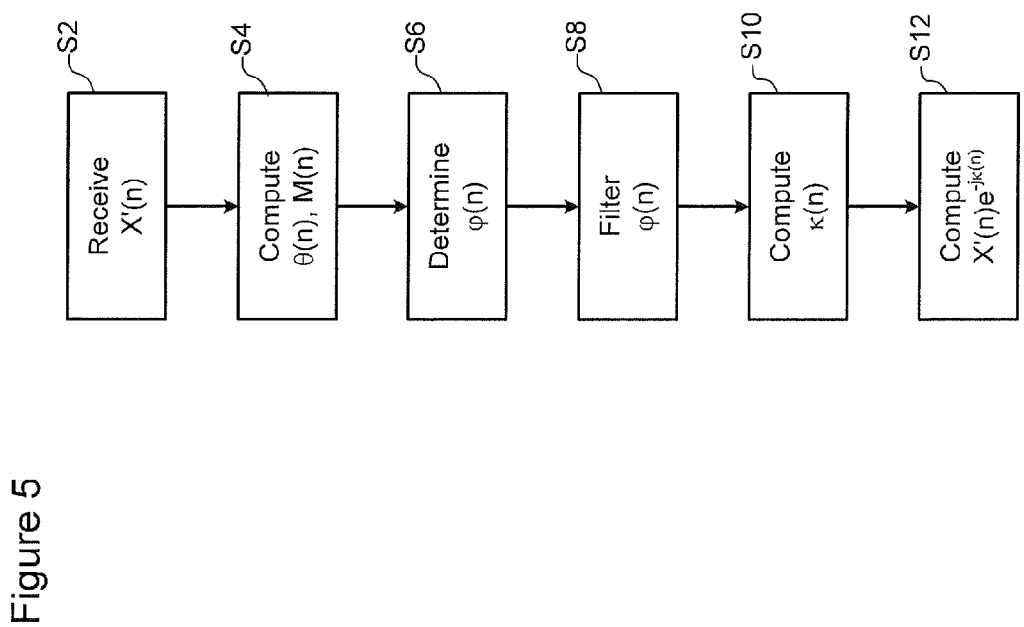
FIG. 5 is a flow-chart illustrating principal steps in a carrier recovery process in accordance with a representative embodiment of the present invention.

FIG. 5 shows a flow-chart illustrating principal operations of a carrier recovery block implementing minimum variance carrier estimation in accordance with a representative embodiment of the present invention. At a first step (step S2), a symbol estimate received from the polarization compensator 20 (FIG. 1) is received and processed (at step S4) to determine its polar coordinate magnitude M(n) and phase θ(n) (or phase error φ(n), if desired). The polar coordinate values are used to determine a respective probabilistic phase error φ(n) value for the symbol (at step S6), which is then filtered (at step S8) to minimize the effects of XPM, AGN, and symbol errors. Thus, in this example, a probabilistic phase error estimate is produced from individual symbol estimates, and then the time series of probabilistic phase error estimates is filtered to minimize the variance in the time series. In some embodiments, a Wiener filter is used. In other embodiments, an approximation of a Wiener filter may yield satisfactory results. For example, as the Wiener filter generally is a low pass filter, it can be approximated as a moving average filter. The filter output represents a minimum variance estimate of the symbol phase error, and is used (at step S10) to compute a corresponding minimum variance phase rotation κ(n) which compensates frequency offset Δf, laser line width and XPM. This minimum variance phase rotation κ(n) is then applied to the symbol estimate (at step S12) to yield a corresponding rotated symbol estimate in which the residual phase error is random and comparatively small. As a result, rotated symbol estimates can be processed using known methods to determine a decision value representing the most likely value of each transmitted symbol. An advantage of this approach is improved noise tolerance in the receiver.

Figure 6:
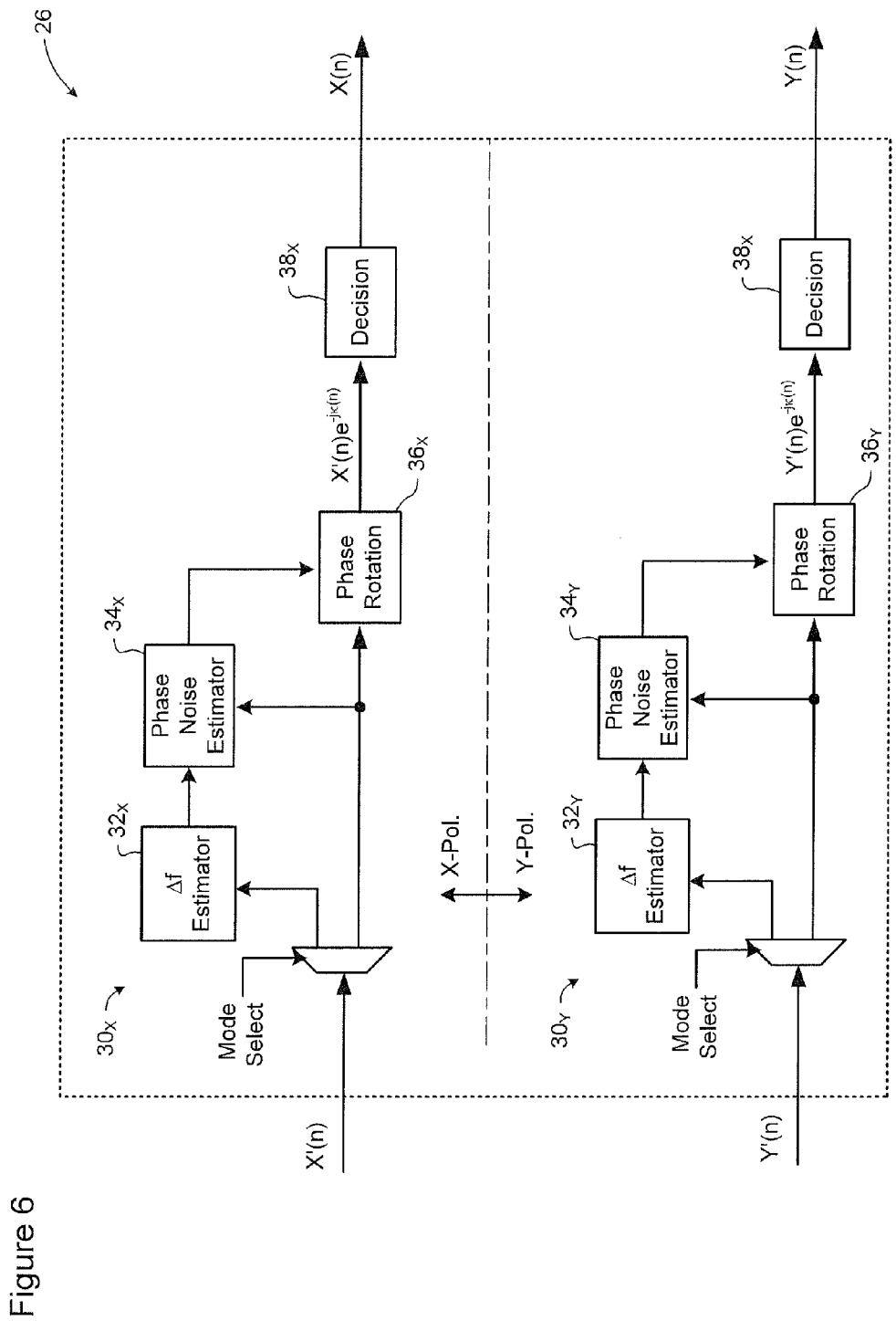
FIG. 6 is a block diagram illustrating principal elements in a carrier recovery block implementing methods in accordance with a representative embodiment of the present invention.

FIG. 6 schematically illustrates a representative carrier recovery block 26 which implements methods in accordance with a representative embodiment of the present invention.

In the embodiment of FIG. 6, the carrier recovery block 26 is divided into two substantially identical processing paths 30; one for each transmitted polarization. Each processing path 30 receives a respective output of the polarization compensator 20, and outputs recovered symbols of its respective transmitted polarization. Each processing path 30 includes a frequency error estimator 32, a phase noise estimator 34, a phase rotator 36, and a decision circuit 38. In general, each phase rotator 36 uses an estimate of the phase noise generated by the phase noise estimator 34 to compute and apply a phase rotation κ(n) to the symbol estimates received from the polarization compensator 20. The phase-rotated symbol estimates $X'(n)e^{-jκ(n)}$ and $Y'(n)e^{-jκ(n)}$ generated by the phase rotators 36 are then processed by the decision circuits 38 to generate the recovered symbol values X(n) and Y(n). Representative embodiments of each of these blocks will be described in greater detail below.

Figure 7:
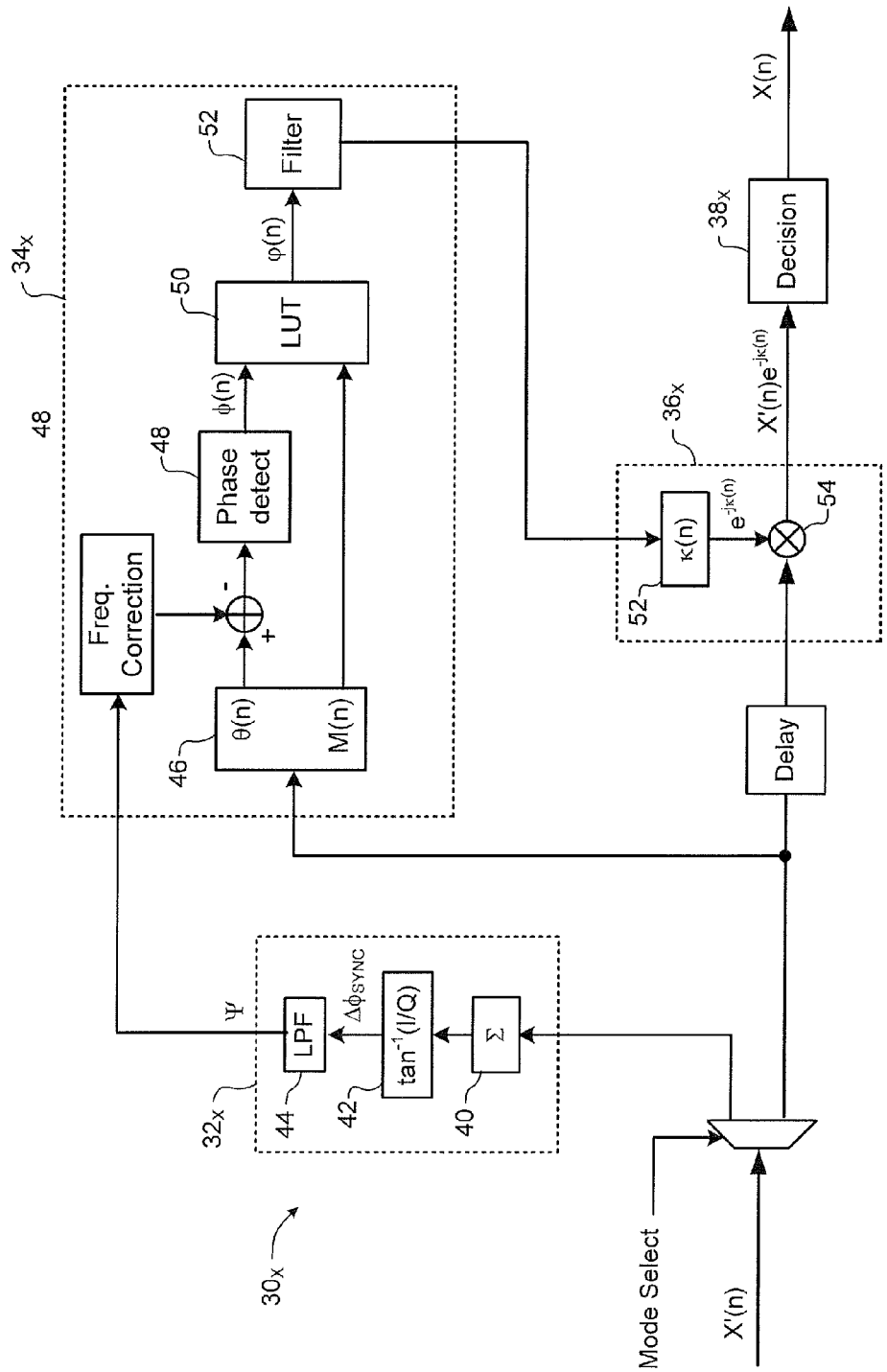
FIG. 7 is a block diagram illustrating the carrier recovery block of FIG. 6 in greater detail.

FIG. 7 schematically illustrates the carrier recovery block 26 of FIG. 6 in greater detail. It will be noted that only the X-Polarization processing path $30_X$ is illustrated in FIG. 7, it being understood that a substantially identical arrangement will be provided for the Y-Polarization processing path $308_Y$. The carrier recovery 26 block of FIG. 7 is configured for two operating modes, namely: a "training" mode while processing a SYNC burst 14; and a "data directed" mode while recovering transmitted data symbols 16. In the training mode, the correlation values output by the polarization compensator 20 are supplied to the frequency error estimator 32, which computes a local slope ψ as an estimate of the frequency error due to the frequency offset Δf between the transmit laser and the LO and independent laser line width. In the embodiment of FIG. 7, the SYNC burst correlation values output by the polarization compensator 20 are accumulated (at 40) to average the correlation across at least a portion of the SYNC burst 14. The I and Q components of the averaged correlation value are then used to compute a phase error estimate $$Δφ_{SYNC} = \tan^{-1}\left(\frac{Q}{I}\right)$$

of the SYNC burst at 42. This SYNC burst phase error estimate represents the average phase error of the symbols comprising the SYNC burst, relative to the ideal phase of those symbols, as determined by the encoding format (e.g. PSK, QPSK, 16-QAM etc.) of the optical signal.

As may be appreciated, the symbol estimates of each SYNC burst contain phase errors due to frequency offset Δf, laser linewidth, and XPM. Computing an average phase error of each SYNC burst has an effect of low-pass filtering the individual phase errors of the SYNC burst symbols at 44, and so tends to reduce the effects of laser phase noise and XPM. A further reduction in the effects of laser phase noise and XPM can be obtained by low-pass filtering the respective phase error estimates $Δφ_{SYNC}(i)$ of two or more successive SYNC bursts (i=1 . . . m) to compute the local slope ψ.

Once the SYNC symbols 14 have been processed, the receiver switches to the data directed mode, during which the phase noise is computed and used to rotate data symbol estimates, and the resulting rotated symbol estimates $X'(n)e^{-j\kappa(n)}$ and $Y'(n)e^{-j\kappa(n)}$ processed by the decision circuits 38 to generate the recovered symbol values X(n) and Y(n). This operation will be described in greater detail below.

In general, the phase noise estimator 34 uses the symbol estimates output from the polarization compensator 20, and the local slope ψ output from the frequency estimator 32 to compute a minimum variance estimate of the phase noise due to frequency offset Δf, independent laser line width, and XPM.

As may be seen in FIG. 7, during each clock cycle (m), a set of N successive symbol estimates X'(i) from the polarization compensator 22 are supplied to a converter 46 (which may be configured as a CORDIC converter known in the art), which processes the Real (Re) and Imaginary (Im) components of each symbol estimate X'(i) to obtain the corresponding polar coordinate (magnitude (M) and Phase (θ)) values. The phase θ is corrected or the unbounded phase ramp due to the frequency offset Δf, as represented by the local slope ψ output by the frequency detector 32. The resulting corrected phase θcorr is then supplied to a phase detector 48, which outputs an estimate of the phase error value φ(n) of the corresponding symbol estimate.

If desired, respective phase error value φ(n) can be accumulated over a set of N successive symbol estimates. and used to compute a Minimum Mean Square Estimate (MMSE) phase error, which can then be used in subsequent processing as described below. It will be noted that the above-described techniques for estimating the phase error φ(n) are examples of feed-forward methods, since the phase error φ(n) is estimated without reference to the decision value X(n) output by the decision block 38. In alternative embodiments, the feed-back computation methods described in U.S. Pat. No. 7,606,498 or co-pending U.S. patent application Ser. No. 12/644,409 may be used to compute the estimated symbol phase error φ(n).

Referring again to FIG. 7, the respective magnitude and phase error value φ(n) are then supplied to a look-up-table 50, which is configured to output a probabilistic phase error φ(n) value based on the received symbol magnitude and phase error value φ(n). The probabilistic phase error φ(n) value output from the LUT 50, is then filtered (at 52) to remove residual noise due to AGN and XPM. As mentioned previously, a Wiener filter may be used for this purpose. Alternatively, approximations of a low pass filter function, such an computing a running average over the respective probabilistic phase error φ(n) values obtained for set N successive symbol estimates may be used. The filter output represents a minimum variance estimate of the phase noise Δφ(n), which is then passed to the phase rotation block 36.

In general, the phase rotation block 36 computes and imposes a phase rotation κ(n) which compensates phase errors of the corresponding symbol estimates X'(n) and Y'(n), due to frequency offset, laser line width and XPM. For example, each successive value of the phase rotation κ(n) may be computed using a function of the form:

$$\kappa(n+1) = \kappa(n) + \mu_1 \Psi + \mu_2 \Delta\phi(n+1)$$

where the scaling $\mu_1$ and $\mu_2$ may be programmable, and define the phase adjustment step sizes for each successive data symbol estimate within the data block. The first order phase rotation term $\mu_1\Psi$ compensates the unbounded phase rotation due to the frequency offset Δf between the transmit and LO lasers and independent laser line-width. The second order phase rotation term $\mu_2\Delta\phi(n+1)$ represents the minimum variance phase noise estimate computed as described above, and is updated at the symbol rate. Integrating the result over the frequency range of the optical signal yields the variance of the residual XPM and laser noise. This is only mathematically valid because the unbounded phase error contributions are compensated by the first order phase rotation term $\mu_1\Psi$.

Taken together, the first and second order terms $\mu_1\Psi$ and $\mu_2\Delta\phi(n+1)$ provide an estimate of the incremental phase change Δκ between the $n^{th}$ and $(n+1)^{th}$ symbols. Accumulating this incremental value Δκ for each successive data symbol yields the updated phase rotation κ(n+1) at 52.

Applying the phase rotation κ(n) to each symbol estimate X'(n) and Y'(n) at 54 yields rotated symbol estimates $X'(n)e^{-j\kappa(n)}$ and $Y'(n)e^{-j\kappa(n)}$ in which the unbounded phase rotation due to the frequency offset Δf between the Tx and LO lasers, independent laser line-width, and XPM have been removed. The streams of rotated symbol $X'(n)e^{-j\kappa(n)}$ and $Y'(n)e^{-j\kappa(n)}$ will therefore exhibit a minimum variance phase error, with short period phase excursions due primarily to AGN.

If desired, the decision block 38 may operate to determine the decision values X(n) and Y(n) representing the most likely transmitted symbols, in a manner as described in U.S. Pat. No. 7,606,498.

In the foregoing examples, each probabilistic phase error φ(n) value is calculated from a corresponding complex valued symbol estimate. Alternatively, each probabilistic phase error φ(n) may be calculated from multiple symbols (as noted above) or more intricate symbol estimates. Linear filtering of the probabilistic phase error estimates is advantageous for minimizing complexity of implementation. However, nonlinear filtering operations could be performed, if desired. Cartesian filtering could be used, but it generally suffers performance degradations in the presence of XPM. For simplicity of description, the carrier recovery block 26 is described as having a single processing path 30 for each polarization. However, to enable implementation at high speeds it may be desirable to implement parallel processing paths, and/or approximate operations. For example, one minimum variance rotation value κ(n) may be computed and then applied to a set of N (e.g. four, eight, or sixteen) successive symbol estimates.

The probabilistic phase error calculation described above uses only the linearly processed symbol estimates, in polar coordinates. However, other information and other processing could be used. For example, error probabilities from parity bits, forward error correction, error probability estimation, or turbo equalization could also be used. Nonlinear polarization or phase compensation could be applied.

Furthermore, the probabilistic phase error calculation described above uses all of the symbol estimates output from the polarization compensator 20 (FIG. 1). However, if desired, the probabilistic phase calculation can be a nonlinear function of a plurality of samples. For a channel with highly correlated XPM, an advantageous example of this is to consider the respective phase errors of a set of N (eg N=16) consecutive symbol estimates, and discard the M (eg M=2) outliers in the set. The subsequent calculations and filtering are a function of the remaining N−M samples in this set, and other such sets. Alternatively, nonlinear filtering of a sequence of probabilistic phase estimates could comprise an emphasis operation such as Median Filtering where a subset of the estimates is selected. For simplicity of implementation, these examples use a choice of inclusion or exclusion of individual samples. However, more subtle methods of emphasis and de-emphasis could be used if desired. For example: multiplication of an estimate by a multi-bit weight, or trellis selection where sequences of candidate decodings of the samples are considered and one sequence is selected.

It is desirable that the minimum variance rotation κ(n) applied to a given symbol estimate not be derived from the phase and magnitude of that symbol estimate, but rather only from the phase and magnitude values for other symbol estimates which have respective phase errors that are correlated to the phase error of the given symbol. In other words, the optimal filter function applied to the time series of probabilistic phase error φ(n) values (FIG. 5 at S8) has an impulse response that is zero at time zero. For simplicity of implementation, one may choose the sub-optimal approximation of including some information derived from the given symbol in its own rotation estimate, if that information has been diluted with information from many other symbols.

In the foregoing description, the calculation of the probabilistic phase error φ(n) is based on the symbol estimate represented by its polar coordinate values of magnitude M and phase θ (or phase error φ(n)). However, it is contemplated that a mathematically equivalent calculation may be performed using the Cartesian coordinate representation of the symbol estimate. In such a case, the step of computing the magnitude M and phase φ at FIG. 5, step S4 is omitted. Instead, the Real and Imaginary components of the symbol estimate may be adjusted to compensate for the frequency offset Δf, and then combined to form an input vector to a look-up-table to obtain the probabilistic phase error φ(n). The look-up table may output the probabilistic phase error φ(n) in either polar or Cartesian coordinate form, as desired. In embodiments in which the Cartesian coordinate form of the probabilistic phase error φ(n) is used, it will be desirable to convert the minimum variance phase noise Δφ(n) output from the filter (FIG. 7 at 52) to polar coordinate representation for computation of the phase rotation κ(n), or equivalently scale to unit radius and conjugate multiply. Cartesian averaging could be used in the filtering, but that generally suffers performance degradations in the presence of XPM.

The methods disclosed herein have at least two advantages over known Viterbi-Viterbi phase and frequency estimation algorithms. In particular, the present technique considers the statistical properties of the additive noise (such as ASE) and the additive phase noise in the phase estimation. In other words, the phase-detector output depends on the probability density function of phase-error and additive noise (such as ASE) and any source of noise/distortion in the system. In contrast, known Viterbi-Viterbi algorithms yield a phase-error estimate that is independent from statistics of the system and channel. For example, if the standard deviation of additive noise (eg Amplified Spontaneous Emission (ASE)) becomes much smaller (compared with the phase noise), the output of the phase noise estimator 34 (FIG. 6) will have less dependency on the information of the received symbol's magnitude value (M(n)), independent of the phase-error φ(n) of any given symbol estimate. However, prior art methods such as Viterbi-Viterbi estimate the phase error based on the phase difference to the decided symbol, so the estimated phase error will vary on a per-symbol basis, independent of the statistics of the optical communication system. Furthermore, the presently disclosed methods can take in to account the probability of making mistake in deciding the actual transmitted symbol. In other words, the calculation of the conditional probability function of phase-error also can consider the probability that the transmitted symbol is not the symbol closest to the symbol estimate. In contrast, prior art methods such as Viterbi-Viterbi assume that the transmitted symbol is the symbol closest to the symbol estimate which causes increased phase variance or risk of cycle slips.

Although the invention has been described with reference to certain specific embodiments, various modifications thereof will be apparent to those skilled in the art without departing from the spirit and scope of the invention as outlined in the claims appended hereto.

We claim:

1. In a coherent receiver of an optical communications system, a method of data symbol recovery comprising:
    a phase noise estimator computing a respective probabilistic phase error for each of a plurality of data symbol estimates;
    a phase rotator computing a phase rotation based on the probabilistic phase error estimates, using a filter function;
    the phase rotator applying the phase rotation to at least one data symbol estimate to generate a corresponding rotated symbol estimate; and
    a decision circuit processing each rotated symbol estimate to generate corresponding decision values of each data symbol;
    wherein computing the respective probabilistic phase error comprises calculating an expected value of phase noise based on a conditional probability density function, the probability density function being conditioned on at least one symbol estimate.

2. The method of claim 1, wherein the conditional probability density function is a probability density function of the phase error, or an operator thereof.

3. The method of claim 1, wherein computing the respective probabilistic phase error comprises, for each data symbol estimate:
    calculating respective polar coordinate symbol phase and magnitude values of the symbol estimate;
    calculating a phase error of the symbol estimate, based on the calculated symbol phase; and
    calculating the respective probabilistic phase error based on the calculated phase error and the symbol magnitude.

4. The method of claim 3, wherein calculating the phase error comprises:
    adjusting the detected symbol phase to compensate frequency offset between a transmit laser and a local oscillator of the coherent receiver, to generate a corrected symbol phase; and
    calculating the phase error between the corrected symbol phase and a nearest symbol of an applicable encoding scheme.

5. The method of claim 1, wherein computing a respective phase rotation comprises:
    filtering minimum variance probabilistic phase errors calculated for a time series of successive symbol estimates to obtain a minimum variance phase error; and
    calculating a minimum variance phase rotation using the minimum variance phase error.

6. The method of claim 5, wherein filtering the probabilistic phase errors comprises any one or more of:
    applying a Wiener filter to the probabilistic phase errors; and
    computing a running average over the probabilistic phase errors.

7. The method of claim 5, wherein computing the minimum variance phase rotation comprises accumulating, for each successive data symbol estimate, a corresponding incremental phase rotation corresponding to $\mu_1\Psi+\mu_2\Delta\phi(n+1)$, where $\mu_1$ and $\mu_2$ are a scaling factors defining a phase adjustment step size for each successive symbol estimate; $\Psi$ is a phase slope indicative of unbounded phase error due to frequency offset; and $\Delta\phi(n+1)$ is the minimum variance phase error.

8. The method of claim 1, further comprising an operation of emphasis of a subset of calculated probabilistic phase error values.

9. The method of claim 5, wherein filtering the probabilistic phase errors comprises the operation of emphasis of a subset of the probabilistic phase error values being filtered.

10. A coherent receiver of an optical communications system, the coherent receiver comprising:
- a phase noise estimator configured to compute a respective probabilistic phase error for each of a plurality of data symbol estimates;
- a phase rotator configured to compute a phase rotation based on the probabilistic phase error estimates, using a filter function, and for applying the phase rotation to at least one data symbol estimate to generate a corresponding rotated symbol estimate; and
- a decision circuit configured to process each rotated symbol estimate to generate corresponding decision values of each data symbol;
- wherein computing the respective probabilistic phase error comprises calculating an expected value of phase noise based on a conditional probability density function, the probability density function being conditioned on at least one symbol estimate.

11. The coherent receiver of claim 10, wherein the conditional probability density function is a probability density function of the phase error, or an operator thereof.

12. The coherent receiver of claim 10, wherein the phase noise estimator comprises:
- a converter configured to calculate respective polar coordinate symbol phase and magnitude values of each symbol estimate;
- a phase detector configured to calculate a phase error of each symbol estimate, based on the symbol phase; and
- a Minimum Mean Square Error processor configured to calculate the respective probabilistic phase error based on the calculated phase error and the symbol magnitude.

13. The coherent receiver of claim 12, wherein the Minimum Mean Square Error processor comprises a look-up-table.

14. The coherent receiver of claim 12, further comprising a frequency correction block configured to adjust the symbol phase to compensate frequency offset between a transmit laser and a local oscillator of the coherent receiver, to generate a corrected symbol phase, wherein the phase detector is configured to calculate the phase error between the corrected symbol phase and a nearest symbol of an applicable encoding scheme.

15. The coherent receiver of claim 12 further comprising a filter block configured to filter probabilistic phase errors calculated for a time series of successive symbol estimates to obtain a minimum variance phase error.

16. The coherent receiver of claim 15, wherein the phase rotator is configured to calculate a minimum variance phase rotation using the minimum variance phase error.

17. The coherent receiver of claim 16, wherein the phase rotator is configured to compute the minimum variance phase rotation by accumulating, for each successive data symbol estimate, a corresponding incremental phase rotation corresponding to $\mu_1 \Psi + \mu_2 \Delta\phi(n+1)$, where $\mu_1$ and $\mu_2$ are a scaling factors defining a phase adjustment step size for each successive symbol estimate; $\Psi$ is a phase slope indicative of unbounded phase error due to frequency offset; and $\Delta\phi(n+1)$ is the minimum variance phase error.

18. The coherent receiver of claim 15, wherein the filter block comprises any one or more of:
- a Wiener filter; and
- an averaging circuit configured to compute a running average over the probabilistic phase errors.

* * * * *